3,460,323
Patented Aug. 12, 1969

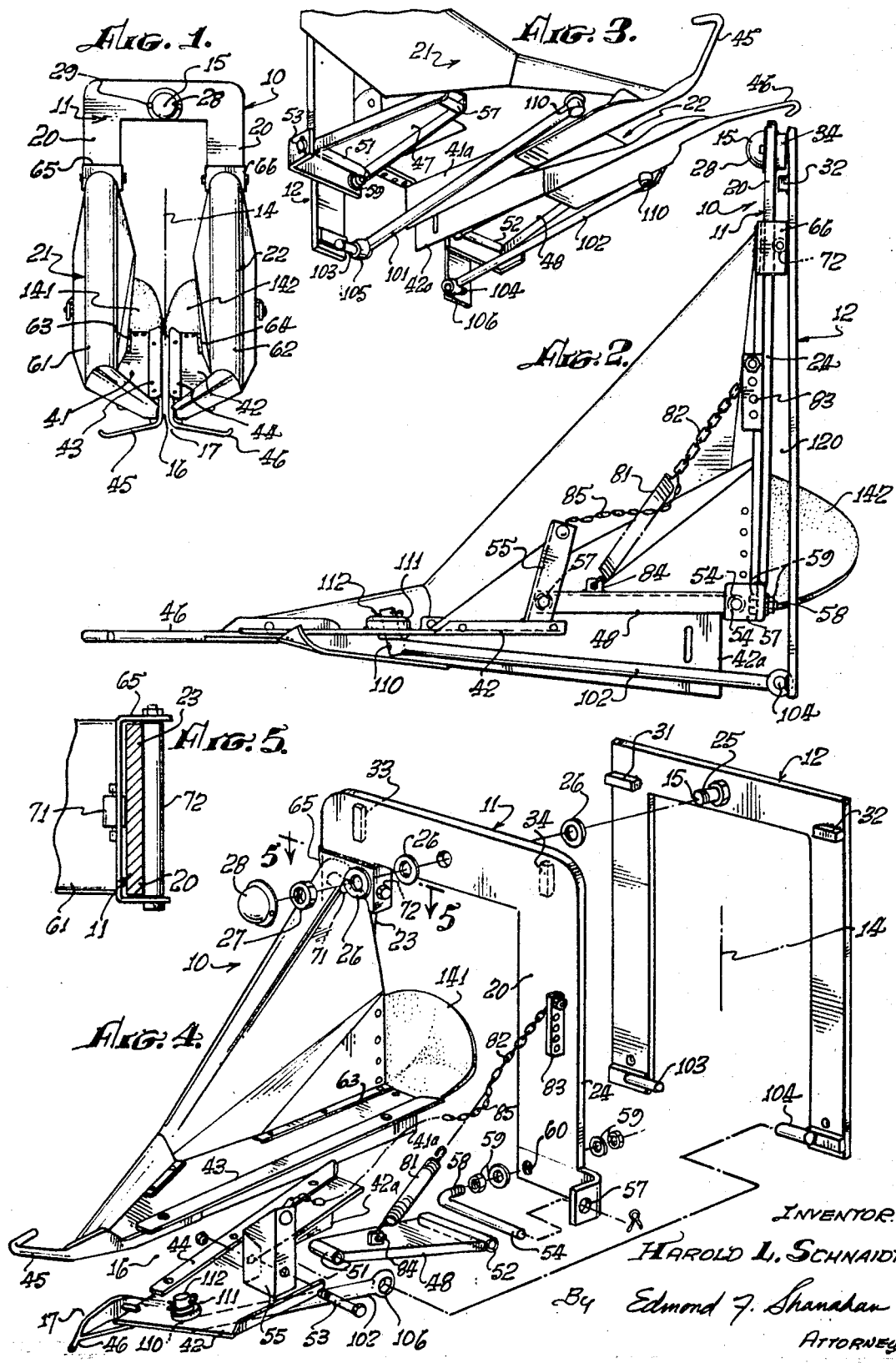

3,460,323
ROW-FOLLOWER
Harold L. Schmaidt, % Agricultural Equipment & Sprayer Co., 410 21st St., Bakersfield, Calif. 93301
Filed Jan. 23, 1967, Ser. No. 611,044
Int. Cl. A01d 45/18
U.S. Cl. 56—11                 7 Claims

ABSTRACT OF THE DISCLOSURE

An attachment for mounting on the front of a cotton picker (or similar machine) for guiding cotton stalks (or the like) into the machine's picking opening, as it progresses down the row of plants being picked. The attachment comprises a pair of forwardly projecting arms, each of which includes its own linkage and spring means to permit resilient deflection inwardly, independently of the other, both arms being carried on an inverted yoke structure, which is suspended at an overhead point so as to swing freely in a vertical plane transverse to the direction of machine travel.

---

This invention relates generally to row-followers for use on the front of picking machines, such as cotton pickers, and more particularly, to a row-follower which combines a laterally-swinging system (including vertically-movable right and left side collector pans) with right and left thrust links, which hold the swinging system in a forwardly-spaced relationship from two pivot mounting points at the lower front of the machine.

The present invention will be discussed with reference to cotton picking, since the invention has already achieved wide and successful application in that field, and cotton picking illustrates substantially all of the problems of row-following applications of this invention. However, it will be understood that the row-follower of the invention may be used in any agricultural application of a like nature.

Cotton picking machines are large self-propelled agricultural machines which an operator drives with the machine straddling a row of cotton plants. As the machine moves over the row of cotton plants, each cotton bush enters an opening in the front of the machine and passes though cotton picking mechanism inside the machine. The plant emerges at the rear of the machine, stripped of cotton, but relatively intact, and not uprooted. The cotton plants pass through the interior of the cotton picking machine though a passage which may be termed for purposes of convenience in this application, as a picking passage, which passage is open at the bottom, and extends from the front opening of the machine throughout its entire length to the rear opening.

It is the major object of the present invention to provide a row-follower which is mounted to the front of the cotton picking machine at three widely-spaced mounting points, each of them a pivot-type mounting, but each adapted to absorb substantial longitudinal shocks, without suffering structural damage.

The row-follower of the invention achieves lateral row-following movement by means of a swinging pendulum suspension system. The principal swinging structure is a yoke with downwardly-depending right and left arms at the right and left sides of the front opening of the cotton picker.

Branch-collecting assemblies are mounted at each side of the swinging system on an associated yoke arm.

Each of the collector assemblies is vertically-moveable on its associated yoke arm. It is an important object of this invention to provide a roller bearing system for the independent vertical movement of each of the collector systems on its associated yoke arm.

It is practically impossible for the driver of the cotton picking machine to drive in perfect alignment with the row of cotton bushes. Consequently, many bushes are damaged or not completely picked.

Also, parts of the machine tend to deflect lower branches on the cotton bush so that they escape the picking mechanism.

The present invention is a row-following attachment which can be mounted on the front of any of the widely-accepted cotton picking machines. The row-follower is comprised of moveable parts which feel their way over a regular ground surface, and along the row of plants, despite irregularities in the row, or irregularities in the steering, to effectively collect the entire upper portion of the cotton bush, and divert all its branches into the picking mechanism.

Unfortunately, the row-follower is necessarily exposed to a continuous buffeting from the ground surface, and from rocks and clods in its path. Thus, the row-follower must be sensitive enough to have independently-moveable right and left side portions, fully responsive to a substantial range in variation in ground conditions, and row straightness, while at the same time it must be mounted to the front of the cotton picking machine at several points in order to insure sufficient structural strength to withstand many potentially damaging collisions. It is almost as if the forwardly-projecting portions of the row-follower were plowing; of course, it is intended that they have only a ground-surface skid action, and not a plowing action, but it is inevitable that some ground-surface irregularities, and large earth clods, are encountered. These encounters strain the row-follower with substantial thrust forces as the machine pushes the row-follower ahead of it.

The foregoing and other objects and advantages of the invention will be understood from the following description of one preferred form of the invention. The description should be read with reference to the accompanying drawings, in which:

FIGURE 1 is a front elevational view of a row-follower constructed according to the invention;

FIGURE 2 is a right side elevational view of the row-follower of FIGURE 1, but with the shield structure of the right side removed to reveal the suspension of the left side collector pan assembly;

FIGURE 3 is a fragmentary perspective view of the row-follower of FIGURE 1, as seen looking upwardly at the under side of the row-follower from a position to the right front thereof;

FIGURE 4 is a perspective view of an exploded assembly of the row-folower of FIGURES 1–3; and FIGURE 5 is a vertical sectional view looking downwardly in the direction indicated by the arrows 5—5 in FIG. 4, with a portion of the right shield structure broken away to reveal the roller mounting.

In FIGURE 1, a row-follower constructed according to the invention is indicated generally by the numeral 10. However, it will be understood that in this front elevational view, one sees only the laterally-swinging system, identified generally by the numeral 11, and not the mounting plate 12, which is best viewed at the right of the exploded assembly of FIG. 4.

Although no cotton picking machine is illustrated, and no illustration of one is required, it will be understood that the mounting plate 12 is welded or bolted to the front of the cotton picking machine, as an integral part thereof, and centered directly over the cotton picking machine's front opening, which will be in the location indicated by the numeral 14 (in FIG. 4) and under the pendulum pivot location at 15.

It is also important to note that the entire row-follower has an open slot 16 (see FIG. 1) for the convenient passage of the cotton plant stalks from an entry point at 17 through the row-follower's slot 16 to a cotton picker front opening in the general location indicated by the dash line 14.

The front elevational view of FIG. 1 reveals that the major components of the laterally-swinging assembly 11 are a yoke 20, and right and left row-follower assemblies 21 and 22, respectively.

As already mentioned, the yoke 20 swings in pendulum suspension from an axis 15 in the upper center of mounting plate 12. Also, as seen in detail of exploded assembly of FIG. 4, yoke 20 has downwardly-depending right and left arms 23 and 24, respectively, located at the right and left sides of the location 14 of the front opening of the cotton picker.

As will be explained hereinafter, the right and left row-follower assemblies 21 and 22 are mounted on right and left yoke arms 23 and 24, respectively, so as to be freely vertically-slideable on them.

The pendulum suspension at axis 15 may be conveniently constructed of a forwardly-projecting bolt member 25 welded to the front of mounting plate 12, together with appropriate associated washers 26, retaining nut 27, and a spherical cover 28 attached by screws 29 to the front of the yoke 20.

It is desirable to provide stops for establishing limits to the arc of swing of yoke 20 as it moves to the right and left relative to mounting plate 12. A suitably simple and rugged form of such a stop system is illustrated in FIG. 4, and is seen to be comprised of two pairs of inter-engaging steel bars, horizontally disposed bars 31 and 32 being welded to the front of body plate 12, and vertically disposed bars 33 and 34 being welded to the back of yoke 20 as indicated in dash line in the middle upper part of FIG. 4.

Right and left row-follower side members 21 and 22 are identical to each other in construction, except that they are mirror images. Consequently, description of the parts of one will, in each case, be understood to apply to an oppositely-mating complementary part of the other.

Both members 21 and 22 are assemblies of a number of parts all mounted on right and left collector pans 41 and 42. Preferably, these collector pans are substantial steel plates, horizontally disposed, but with a downwardly-turned skirt 41a and 42a at their edges adjacent to the plant stalk slot 16.

An important slot-width adjustment is provided by right and left guide bars 43 and 44, which are bolted to the upper surfaces of collector pans 41 and 42, respectively.

At their forward end, collector pans 41 and 42 feel their way along the ground surface, by means of forwardly-projecting ground skids 45 and 46, respectively.

The right and left collector pans 41 and 42 are hingeably mounted to the lower ends of right and left yoke arms 23 and 24, respectively, but restricted to vertical movement only, by the construction of the lateral stabilizing connecting links 47 and 48, best seen in FIG. 3.

A preferred construction for the lateral stabilizing links 47 and 48 is shown in FIG. 4, in which view, the link 48 is seen to be horizontally-disposed plate with transverse horizontal tubes 51 and 52 for the reception of transverse horizontal hinge pins 53 and 54, at front and rear ends, respectively.

It will be seen from FIG. 4 that a preferred form of construction is a vertical channel structure 55 on collector pan 42, while at yoke arm 24, horizontal transverse bearing position is provided for the pin 54 by means of the transverse horizontal bearing structure 57 and the right-angle bolt and nut construction at 58 and 59 for mounting pin 54 in the hole 60 in the lower inner edge of yoke arm 24.

The collector pans 41 and 42 have heavy sheet metal shields for housings designated respectively by the numerals 61 and 62 in FIG. 1 bolted to the upper surfaces at 63 and 64. Preferably, shield 61 and 62 are shaped to present a smooth, guiding surface for the branches of the cotton plant. From the plant entrance at 17, the wall surfaces of the shields 61 and 62 diverge backwardly and upwardly to the upper front surfaces of yoke arms 23 and 24.

The uppermost backward ends of shields 61 and 62 are provided with backwardly-opening channel members 65 and 66, which, as seen in FIG. 5, are designed to closely receive the vertical yoke arms 23 and 24.

It will be seen that during vertical movement of the right and left row-follower numbers 21 and 22, the shields 61 and 62 are confined to vertical movement on yoke arms 23 and 24, respectively, by rolling contact between the front and back surfaces on said arms and a pair of horizontally-disposed transverse roller bearing members, front roller bearing member 71 and rear roller bearing member 72, being illustrated for shield 61, in the horizontal cross-sectional view of FIG. 5.

In the side elevational view of FIG. 2, with the left side shield 62 removed, it is seen that the collector pan 42 is resiliently suspended near or a little above ground level from yoke arm 24 by virtue of a resilient helical spring 81, and chain 82, between the mounting bracket 83 on the front of the yoke arm 24, and an anchor connection 84 on the forward upper surface of lateral stabilizer link 48. Preferably, downward deflection of the left row-follower member 22 is limited by a limiting chain connection 85 between the upper end of element 55 and chain 82. It should be noted, also, that mounting bracket 83 is provided with a number of holes so that some selection in elevation of the left row-follower member 22 may be made by the connection of chain 82.

It is an important feature of novelty of the invention, and one which distinguishes the present row-follower from structurally fragile alternative constructions, that backward thrust on the forwardly-projecting row-follower members 21 and 22 is not absorbed, for the most part, by the swinging assembly 10. Instead, powerful thrust links 101 and 102 extend directly from the lowermost ends of the mouting plate 12, to the most forward portions of the collector pans 41 and 42.

As seen in the exploded view of FIG. 4, these massive thrust bars are free to rotate about a transverse horizontal axis at the rear end, by virtue of rear bearing heads 103 and 104, which are received in bearing bores 105 and 106 in the rear ends of thrust links 101 and 102.

The forward ends of thrust links 101 and 102 are provided with upturned ends journalled in the collector plates 41 and 42 by means of a pair of identical vertical-axis bearings 111 (illustrated for thrust link 102 only). As seen in FIG. 4, the upturned end 110 is retained in bearing 111 by pin 112.

All four bearings (105 and 106, and two bearings 111) on the two thrust links 101 and 102 are of the same type. The bearing surface of each bearing is substantially the zone of a sphere, so as to provide a kind of ball and socket joint, which will accommodate a limited degree of axis tilt in all directions, while being rotatable.

It will be seen from the foregoing description that although the yoke 20 is permitted to laterally swing through a short arc determined by the stops 31 to 34, it is, during all its swinging, held thrust forward at a distance determined by thrust links 101 and 102, and spaced from unwanted engagement with the front surface of the mounting plate 12. Thus, in FIG. 2, this retained spacing is indicated by the numeral 120.

As the cotton picker is driven over the ground surface, the forwardly-projecting skids 45 and 46, and other parts of the row-follower side members 21 and 22 will encounter not only off-center plant stalks, but rocks, ground irregularities, large clods of earth, and other obstructions. In most cases, the skids 45 and 46 will guide the vertically-moveable row-follower side members 21 and 22 in ground-following vertical movement, without much backward thrust. However, on occasion, such backward thrust will occur from obstructions encountered, but it will be transmitted directly to the massive chassis of the cotton picking machine, through the mounting plate 12 which has been made an integral part thereof. Consequently, the laterally-swinging system 11, and all its vertically-moveable parts, will be protected from injury which might occur in the absence of thrust links 101 and 102.

Inevitably, many rocks and clods of earth will be collected in the collector pans 41 and 42, along with the branches of the cotton plants. As the cotton picking machine moves forward, all this material, both wanted and unwanted, will move toward the opening location at dash line 14. However, the heavy clods and rocks will encounter resilient rubber baffles 141 and 142, which will yield and permit the rocks and clods to fall to the ground without passing through the cotton picking machine. However, the stiffness of rubber baffles 141 and 142 is sufficient to deflect the branches of the cotton plant upwardly and into picking position within the cotton picking machine.

Although I have described one preferred embodiment of my invention in great detail, it will be understood that I do not wish to be confined to the specific form thereof. On the contrary, many advancements, improvements, elaborations, or simplifications may be made while still retaining the essential elements of some form of the invention. It is therefore my intention to include all these modifications, and all forms of the invention which however altered can still be found within the metes and bounds of the following claims.

I claim as my invention:

1. On a picking machine of the type which moves along a row of plants, and receives each successive plant into a picking passage through a front opening, which passage is open at the bottom to provide a line of passage for the stalks of said plants, a row-follower for guiding said plants into said front opening, which row-follower includes:

mounting plate means disposed around said front opening, and open at the bottom to accommodate the passage of said plant stalks;

a laterally-swinging yoke, and fulcrum pivot means for attaching said yoke in swinging suspension at the upper center of said mounting plate, said yoke having right and left downwardly-depending arms;

a pair of forwardly-projecting row-following assemblies, and a pair of ground-following skids, one of said skids being attached to the front end of each of said row-following assemblies, and one of each of said row-following assemblies being mounted in vertically-moveable relationship on one associated arm of said yoke, each of said row-following assemblies including:

a collector pan disposed along one side of said line of passage for said plant stalks and adapted to guide said plant into said picking passage;

a lateral stabilizer link between the lower end of said associated yoke arm and said collector pan, said lateral stabilizer link being restricted to hinge action about a horizontal axis substantially transverse to the line of passage of said plant stalks;

a thrust link extending forwardly from the lower end of said associated yoke arm to the forward part of said collector pan, and moveably connected at each end to permit movement of the yoke and row-following assembly while supporting said pan forwardly of said mounting plate means;

moveable mounting and retaining means for holding said assembly in vertically moveable association with said associated yoke arm;

and a pair of resilient spring suspension means, each of which is adapted to hold one of said assemblies in resilient suspension from its associated yoke arm.

2. A row-follower as described in claim 1 in which said means associated with said assembly for holding it in vertically-moveable relationship with its associated yoke arm is comprised of:

a rearwardly-rising shield means integrally attached to said pan, and enclosing one of said resilient spring suspension means;

and roller means mounted on a transverse horizontal axis in the upper part of said shield means, and adapted to be retained in vertically-moveable rolling contact with the vertical surfaces of said associated yoke arm.

3. A combination as described in claim 1 in which each of said collector pans is of generally horizontal structure, but is provided with a downwardly-depending skirt alongside said plant stalk passage.

4. A combination as described in claim 1 in which said plant stalk passage is adjustable in width by means of a pair of guide bars, one on the passage edge of each of said collector pans, said guide bars being adjustably mounted to said collector pans.

5. A combination as described in claim 1 in which the forward end of each of said thrust links is moveably connected to one of said collector pans to permit limited lateral and vertical movement thereof, while retaining the lower ends of said yoke arms spaced away from said mounting plate;

and mating stop means on adjacent surfaces of said mounting plate and said yoke are positioned to engage one another at predetermined limits of right and left lateral swings of said yoke relative to said mounting plate.

6. A combination as described in claim 1 in which said lateral stabilizer link is hingeably-connected at each end, to said collector pan and its associated yoke arm, respectively, adapted to restrict movement of each of said collector pans relative to its associated yoke arm to movement in a substantially vertical plane.

7. A combination as described in claim 1 in which said assemblies have outer walls of each of said assemblies is provided with wall surfaces extending backwardly and converging inwardly toward said front opening, and a pair of resiliently-deflectable baffle means, one mounted at the rearward part of each of said assemblies, each of said baffle means being adapted to resiliently deflect portions of said plant toward said front opening.

References Cited

UNITED STATES PATENTS

| | | | |
|---|---|---|---|
| 2,388,454 | 11/1945 | Weeth et al. | 56—33 |
| 2,835,095 | 5/1958 | Self | 56—33 |
| 3,324,636 | 6/1967 | Honn | 56—11 |

RUSSELL R. KINSEY, Primary Examiner